United States Patent [19]

Weatherston

[11] 3,727,834
[45] Apr. 17, 1973

[54] ENTRY SENSING HEATER CONTROL SYSTEM

[75] Inventor: Richard N. Weatherston, Saint Paul, Minn.

[73] Assignee: Weather-Rite Inc., Saint Paul, Minn.

[22] Filed: Jan. 27, 1972

[21] Appl. No.: 221,269

[52] U.S. Cl. ............................236/9, 98/36, 237/50
[51] Int. Cl. ..............................................F23n 5/14
[58] Field of Search ....................236/9, 91; 98/36; 237/50

[56] References Cited

UNITED STATES PATENTS 3,089,403  5/1963  Banko ....................................98/36

Primary Examiner—William E. Wayner
Attorney—Robert M. Dunning

[57] ABSTRACT

A control system for entryway heating units which is responsive to both the temperature of the entryway and the discharge temperature of the heating unit. The combined resistance of two thermistors positioned in the entryway and in the discharge stream from the heater is monitored to derive a control signal for regulating the flow of fuel to the heater.

7 Claims, 2 Drawing Figures

PATENTED APR 17 1973 3,727,834

ENTRY SENSING HEATER CONTROL SYSTEM

BACKGROUND OF THE INVENTION

In the prior art it is common practice to mount supplemental heater units near entryways at loading docks, garages, and other work areas. The heaters are automatically activated to supply heat whenever the entryway is opened. The supplemental heaters generally include large blowers to direct heated air toward the entryway to offset cold air entering from the outside. Such heaters are expensive to operate and suffer the disadvantage that their performance varies considerably depending upon the differential between the inside and outside temperatures, the temperature of the air that is entering the heater, the size of the entry way opening, the wind and weather conditions, and the amount of fuel delivered to the heater. All of these factors combine to insure that the entryway is never quite properly heated being either too cold or too warm. Such systems are inefficient and waste fuel. My invention, however, overcomes the above referenced problems.

SUMMARY OF THE INVENTION

Briefly, I propose a heater positioned near an entryway which is activated only to the degree necessary to compensate for the conditions encountered. A switch in the entryway automatically activates the blowers in the heater when the door is opened. The amount of heat generated is dependent upon the fuel supply which in turn is controlled by an electronic control system which is responsive to both the temperature in the entryway and the discharge temperature of the heater. By monitoring the temperature in the entryway the relative difference between inside and outside temperatures as well as the effect of winds and other such factors is automatically compensated for. The monitoring of the discharge from the heater allows the efficiency of the heater and the temperature of the incoming heater air to be automatically compensated for. Thus, the entryway is always heated only to the extent necessary to maintain it at a comfortable temperature.

The system includes a first temperature sensitive thermistor placed in the discharge flow from the heater and a second temperature sensitive thermistor positioned proximate the door switch so as to sense the temperature in the entryway. These two thermistors are connected in series. The voltage thereacross is monitored as an indication of the amount of fuel to supply to the heater. It may therefore be seen that it is an object of my invention to provide an improved, more efficient, automatically controlled entryway heating system. Further objects and advantages will become apparent upon consideration of the following drawings and description.

DESCRIPTION OF THE PREFERRED EMBODIMENT

Figure 1:
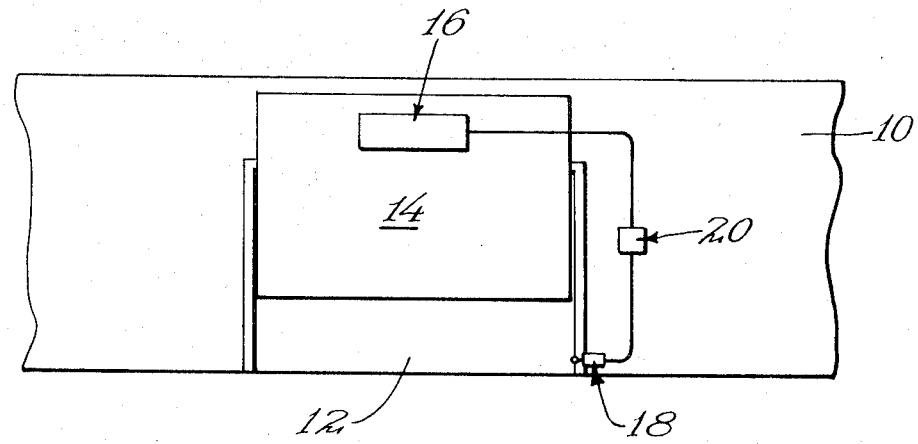
FIG. 1 shows how my invention may be installed in a typical entryway to maintain the entryway properly heated.

In FIG. 1 a typical entryway 12 is shown disposed in a wall 10 and closed by a sliding door 14. A supplemental heater 16, which will be described in greater detail later, is positioned proximate the entryway so as to direct air downward into the entryway area. Heater 16 is activated by means of a door switch 18 which automatically turns on the fans in heater 16 whenever door 14 is open. The amount of heat generated by heater 16 is dependent upon the fuel flow thereto which in turn is dependent upon a signal from control circuitry mounted in the electronic control circuit 20. The operation of my invention may be further understood by reference to FIG. 2.

Figure 2:
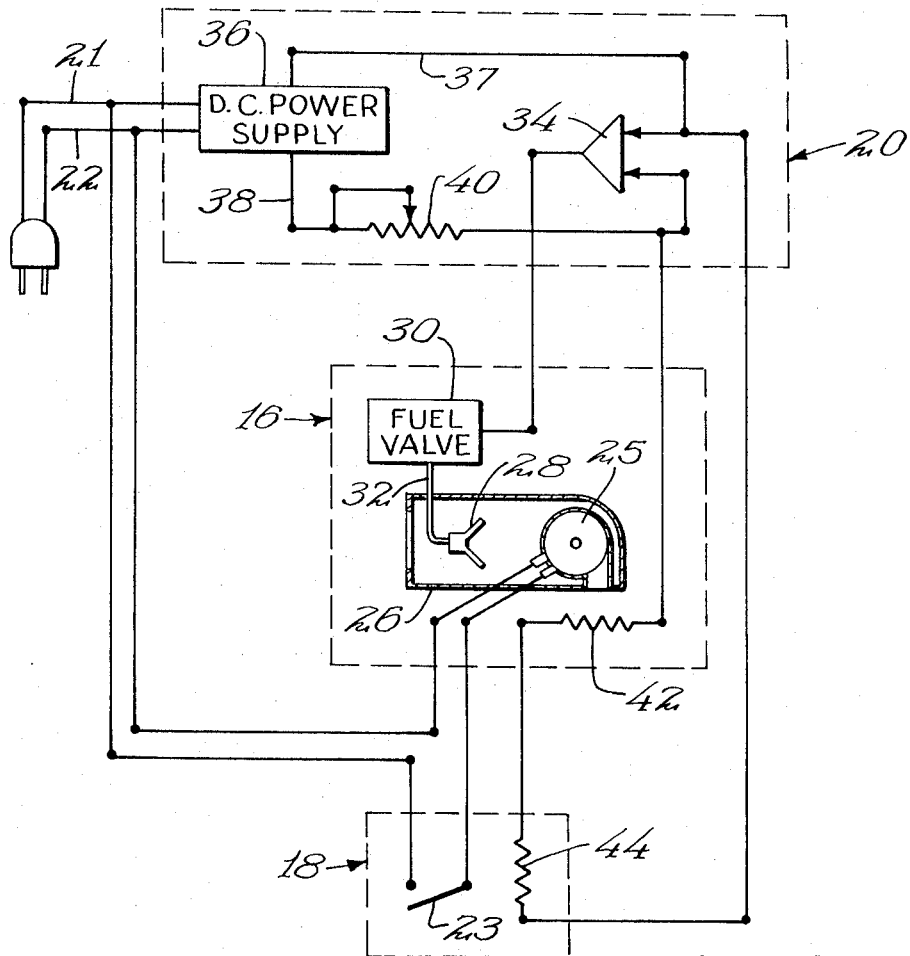
FIG. 2 is a schematic diagram of the major components and circuits of my invention.

In FIG. 2 the door switch 18, the heater 16, and the electronic control circuit 20 are schematically shown by respectively numbered dashed rectangles. The major components of each of these system elements are shown contained therein. Electric power is supplied through lines 21 and 22 to a DC power supply 36 inside electronic control circuit 20 and also to the blower motor 25 positioned within the housing 26 of heater 16. The power on line 21 must pass through a pair of contacts 23 in door switch 18 before reaching blower 25. The opening of door 14, as shown in FIG. 1, activates the contacts 23 in switch 18 so as to automatically turn on the blower 25. Heat is supplied to entryway 12 only if it is necessary to compensate for the temperature in entryway 12. This temperature is measured by a thermistor 44 mounted, for convenience sake, in switch 18 proximate the door opening. Thermistor 44 could be mounted anywhere proximate to the entryway in or out of doors. In the preferred embodiment it is shown enclosed within the switch box 18. Thermistor 44 is connected in series with second thermistor 42 which second thermistor is positioned in the discharge flow from heater 16 so as to be responsive to the temperature therefrom. Voltage from DC power supply 36 is conveyed by input lines 37 and 38 to a differential amplifier 34. The combined resistance of thermistors 42 and 44 operates as a bridge circuit with the power supply and may therefore be measured by differential amplifier 34. A variable resistor 40 is used to trim the circuit. The output signal from amplifier 34 is used to control a fuel valve 30 so as to adjust the amount of fuel flowing through a conduit 32 to a burner 28 in heater 16.

Low temperatures in the entryway 12 cause the resistance of thermistor 44 to be high and, likewise, a low discharge temperature from heater 16 causes the resistance of thermistor 42 to also be high. Thus, a voltage differential is presented to amplifier 34 and this signal is used to activate fuel valve 30 and supply a relatively large amount of fuel to generate a large amount of heat. As the discharge temperature of heater 16 rises, the resistance of thermistor 42 lowers thus decreasing the differential voltage to amplifier 34 which operates to reduce the fuel flow in valve 30. Thus the heat flow from heater 16 is partially stabilized by means of thermistor 42. However, the heat output will continue at the stabilized level until the temperature in entryway 12 is raised sufficiently to bring the resistance of thermistor 44 down as well thus decreasing still further the voltage differential presented to amplifier 34 and again cutting back the fuel flow from valve 30. The valves of thermistors 42 and 44 are chosen so that when the desired temperature is reached in entryway 12 and at the exhaust of heater 16 no further change takes place in the flow of fuel. In the preferred embodiment the thermistor measuring the temperature in entryway 12 was chosen to be generally about 15 times as sensitive as the thermistor measuring the output from heater 16. Thus a 1° change in temperature in the entryway causes as much resistance change as a 15° change in temperature at the exhaust outlet of heater 16. This ratio was found to be effective in providing smooth control of the heating of entryway 12. The resistance ratio of thermistors 42 and 44 can be changed to meet varying conditions or requirements.

I claim:

1. A heater control system comprising in combination:

a supplemental heating unit adapted to be mounted proximate to an entryway, said heating unit incorporating a distribution blower means and an adjustable heat generating means;

switch means in said entryway connected to said blower means so as to activate said blower means in response to the opening of said entryway;

first variable resistance means near said entryway operable to vary in resistance in response to temperature;

second variable resistance means proximate the discharge area of said blower means also operable to vary in resistance in response to temperature; and electronic control means connected to control said adjustable heat generating means in proportion to the combined resistance of said first and second variable resistance means.

2. The system of claim 1 in which said first and second variable resistance means are connected in series and said electronic control means includes a differential amplifying means connected to sense the voltage drop across said series connected resistance means.

3. The system of claim 2 in which the output of said differential amplifying means controls a fuel supply regulating valve in said heat generating means.

4. The system of claim 3 in which said first and second variable resistance means comprise first and second thermistors respectively.

5. The system of claim 4 in which said first thermistor is mounted proximate to said switch means.

6. The system of claim 4 in which said second thermistor is mounted in the discharge from said blower means.

7. The system of claim 5 in which said second thermistor is mounted in the discharge from said blower means.

* * * * *